United States Patent Office 2,990,220
Patented June 27, 1961

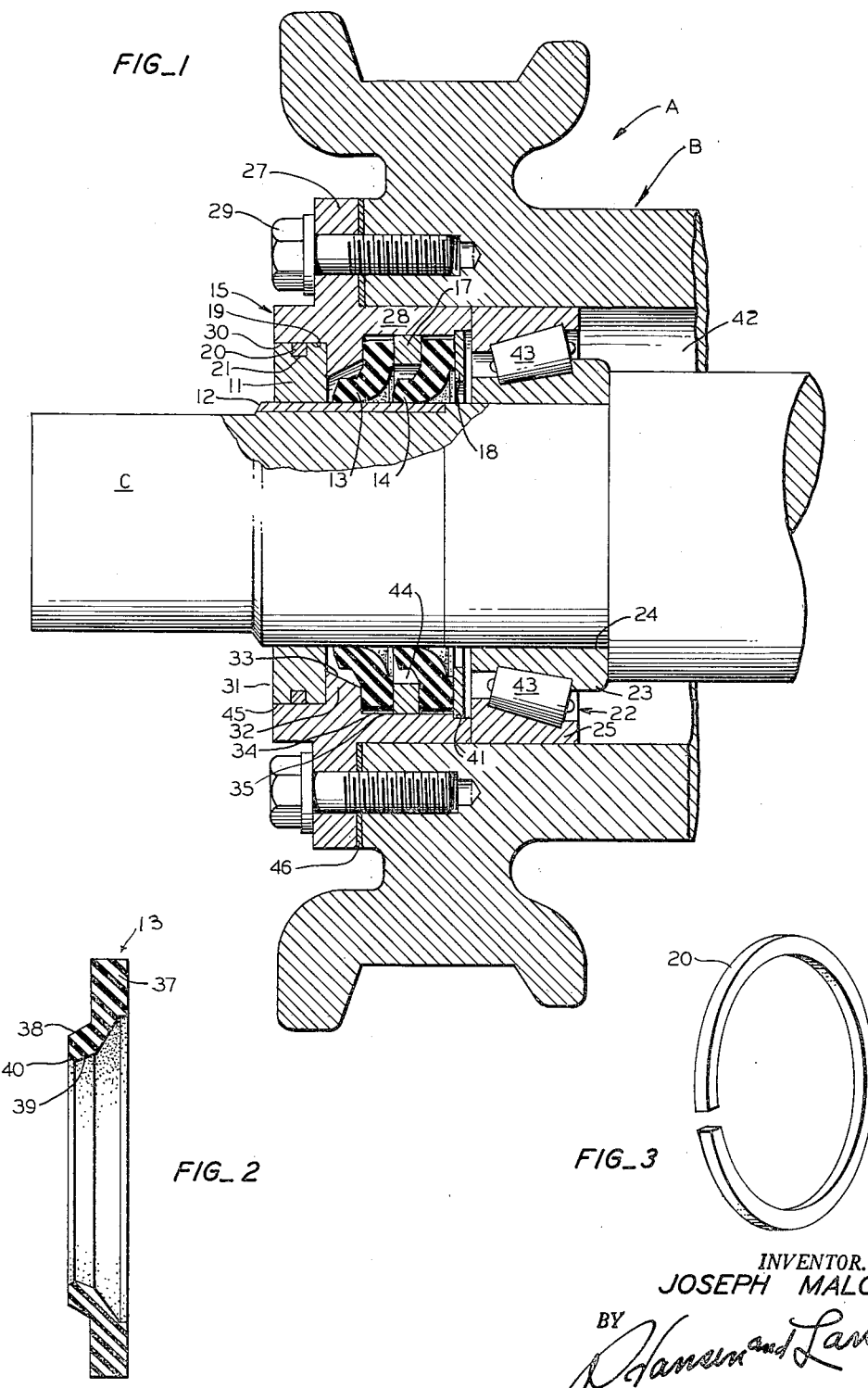

2,990,220
BEARING RETAINER AND SEAL STRUCTURE FOR TRACTOR TRACK ROLLER
Joseph Malone, 98 Gordon Ave., San Jose, Calif.
Filed Oct. 12, 1959, Ser. No. 846,024
3 Claims. (Cl. 308—187.1)

The present invention relates to a seal, and pertains more specifically to a bearing retainer and seal structure for sealing the ends of a track roller of the type employed on track laying tractors.

Track laying tractors are widely used on agricultural, construction, and military projects where a powerful off-the-road type of vehicle is desired, and one which is capable of operating over the most difficult terrain. Such vehicles frequently operate for days, months, and at times for their entire useful life, in fine sand, mud, dust and other abrasive material. Such material is difficult to seal out of the track roller bearings of such tractors, and is most destructive to the bearings if it gains access thereto.

The present invention provides an improved bearing seal, the object of which is to keep grease in track roller bearings and to keep dirt out.

The invention also provides a grease seal wherein various units thereof may be easily replaced and renewed, and which is capable of being easily and inexpensively rebuilt for replacement as a unit.

A further object of the invention is to provide an improved seal for sealing the ends of a track roller bearing of a track laying tractor.

These, and other objects and advantages of the invention, will be apparent from the following description and the accompanying drawings, wherein:

FIG. 1 is a fragmentary sectional view through one of two identical end portions of a track roller having a bearing seal embodying the invention mounted therein, the roller being journaled on a bearing mounted on a supporting shaft.

FIG. 2 is a sectional view, taken along a diametrical plane, of a resilient grease seal mounted in the structure shown in FIG. 1.

FIG. 3 is a perspective view of a seal protector ring.

Briefly, in the illustrated form of the invention, a track roller assembly A comprises a track roller B journaled on a non-rotating support shaft C, and is secured against endwise displacement thereon by an annular seal protector 11 press fitted onto the shaft C. Since both ends of the assembly A are identical, one end portion only thereof is illustrated in FIG. 1.

An inlaid hard surface or sleeve 12 is provided on each portion of the shaft C upon which a pair of resilient grease seals 13 and 14 ride during rotation of the track roller B. A pair of these seals is seated in a bearing retainer 15, one of which is provided in each end of the track roller B. The seals 13 and 14 are spaced apart by a metal spacer ring 17, and are held in place in the bearing retainer 15 by a seal retainer 18, which is press fitted into the inner end of each bearing retainer 15. The seals have sufficient radial clearance from the bearing retainer to avoid distortion in the event the seal material should expand in use.

Each seal protector 11 is press fitted onto the shaft C, and rides in a counterbore 19 provided therefor in the outer end of each bearing retainer 15. A radially outwardly spring urged ring 20 frictionally engages the inward face of the counterbore 19, and rides in a peripheral groove 21 in the seal protector 11 to resist access of dirt and dust to the seals 13 and 14.

Referring to the drawings in greater detail, the track roller support shaft C has a conventional tapered roller bearing 22 of a usual type mounted thereon, the inner race or cone 23, of the bearing 22 being press fitted onto the roller support shaft C, and seated against an offset shoulder 24 provided therefor on said shaft.

The hard inlaid portion 12 may be applied to the shaft C in the form of a tubular sleeve of extremely hard metal, such as, for example, chrome, stellite, or other suitable hard metal or material, or may be applied as a surfacing on the shaft C by suitable means, such as, for example, brazing, plating, silver soldering, metal spraying or hard welding. If necessary, the hard surfacing or sleeve 12 may be ground or honed to a smooth surface concentric with the shaft C after application thereto. The outer bearing race or cup 25 is press fitted into each end of the track roller B, which, per se, is of a conventional and well known type.

Each bearing retainer 15 comprises an annular, radially extending flange portion 27 with a cylindrical sleeve portion 28 formed integrally therewith. Each cylindrical sleeve portion 28 fits into the end of the roller B, which is machined to receive it. Cap screws 29 secure each bearing retainer 15 to the roller B.

An annular seal protector 11 is press fitted onto each end of the shaft C, and fits, with a close running fit, within each counterbore 19. Each seal protector 11 has a peripheral ring groove 21 therein, and a metal seal ring 20, of a cross-sectional shape corresponding to that of the groove 21 is fitted therein.

The seal protector ring 20, shown in full perspective in FIG. 3, is in the nature of an automotive engine piston ring, and with similar outward springing effect, so as to bear firmly against the radially inward face 30 of the counterbore 19 within which it is mounted. The seal protector 11, being press fitted onto the shaft C, thus remains stationary with said shaft, while the seal protector ring 20, being spring pressed outwardly into firm frictional engagement with the bearing retainer 15, rotates with the latter upon rotation of the roller B. The axially outward face 31 of each seal protector 11 preferably is disposed in the same plane as that of the bearing retainer 15 within which it is mounted so as to provide no offset at the annular line of juncture of these two members which might provide a lodging place for dirt or dust.

Within each bearing retainer 15, and forming the inner face of the counterbore 19 in which the seal protector 11 is fitted, is an annular flange 32 having an axially inwardly beveled, radially inner face 33. A first or outer resilient, annular seal 13, shown sectionally in FIG. 2, is of an external diameter to fit, with a slight radial clearance 34, within a cylindrical seal seat 35 provided therefor in each bearing retainer 15, and seats against the axially inward side of the beveled flange 32.

The second or inner seal 14 is spaced inwardly from the outer seal 13 by the metal spacer ring 17, and the seals and their spacer ring are retained in their seat 35 by the seal retainer ring 18, which is press fitted into a counterbore 41 provided therefor in the inner end of the seal seat 35.

The seals 13 and 14 are of suitable tough, resilient, grease resistant material, such as, for example a suitable neoprene compound. Since the manufacturing of such seals is well known to those familiar with the art, and since neither the seal structure nor composition is, per se, a feature of this invention, it will be unnecessary to describe these seals in further detail herein.

The two resilient seals 13 and 14 are identical, each comprising an annular outer portion 37 (FIG. 2) of substantially rectangular cross sectional shape, and an angularly offset inner lip portion 38. The inner diameter of each lip portion 38 is slightly less than the external diameter of the hard surfaced portion 12 of the shaft C upon which the seals 13 and 14 are mounted. Thus, when the seals are fitted onto the shaft C the seal lips 38 are distended slightly, as shown in FIG. 1, and are also flexed laterally from their normal, unstressed condition of FIG. 2. When so stretched the radially inward face 39 of each seal is brought into bearing, sealing relation with the shaft C.

The radially inward edge portion of each seal lip 38 is beveled slightly at 40 to avoid a feather edge at this point, and thus more effectively resists the entrance between the seal and the shaft of any dirt or dust which might work its way in past the seal protector 11.

The space 42 between the roller B and the shaft C is packed with a suitable lubricating grease (not shown) and the seal rings 13 and 14 retain the grease in the space 42 indefinitely, so that usually it is unnecessary to re-lubricate the rollers during their entire life. However, no known seals are effective indefinitely under all conditions and in all instances. Occasionally, therefore when a track-laying tractor is constantly operating in deep mud, dust or sand, dirt may eventually work its way into the seal structure and destroy the seals. However, the present bearing seal structure has proven itself most effective for long periods of time under the most adverse conditions, and has out-lasted other known type of prior seals.

In practicing the invention, the hard metal facing or sleeve 12 is applied to the shaft C in any suitable manner, as explained previously herein, and, if necessary, is ground or otherwise suitably machined to a smooth surface concentric with the remainder of the shaft C. A bearing cone 23 is then pressed onto each end of the shaft C, both ends of the entire roller assembly A being identical, as mentioned previously herein. A bearing cup 25 is then press fitted into one end of the roller B, and a bearing retainer 15, complete with seals 13 and 14, spacer ring 17, and seal retainer 18, is then mounted on one end of the roller B, and is secured thereto by the screws 29.

The bearing rollers 43 are then mounted in a usual manner on the cones 23, and the shaft C, with the cones 23 and the bearing rollers 43 thereon, is then inserted, as shown in FIG. 1, into the other end of the roller B from that having the bearing retainer 15 thereon. The space 42 between the shaft C and the track roller B, and the space 44 between the seals 13 and 14, are then packed with grease (not shown). The second bearing cup (not shown but similar to the cup 25) is then press fitted into the roller B, and the latter bearing cup is adjusted for bearing pre-load.

The other identical bearing retainer 15, with its seals, seal spacer and seal retainer therein, is then mounted on the other end of the track rollers B and secured thereto by screws 29, a suitable shim 46 being inserted if necessary between the bearing retainer 15 and the end of the roller to bring the bearing retainer into contact with the bearing cup 25 without displacing the latter from its pre-loaded position of adjustment. A seal protector 11 with its ring 20 fitted into its groove 21, is then press fitted one onto each end of the shaft C to ride freely in the counterbore 19 provided therefor.

When fitting each seal protector 11 into its counterbore 19, the seal protector rings 20, which, as mentioned previously herein, tend to spring outwardly in the nature of an internal combustion engine piston ring, are compressed into their grooves 21 by suitable means, not shown, which may be similar to the ring compressors which are commonly used for compressing automobile piston rings while inserting a piston on which they are mounted in its cylinder.

By making each seal protector 11 a few thousandths of an inch less in thickness than the depth of the counterbore 19 provided therefor, each seal protector 11 may be pressed fitted flush with the outer end of its bearing retainer 15, which simplifies the matter of assembly, and also provides the flush outer faces of bearing retainer 15 and seal protector 11 desired to prevent the lodging of dirt and dust at the exposed juncture line 45 of these two members.

The invention provides a simple, sturdy and most effective seal, and one which will usually endure for the entire life of a track roller assembly A in which it is embodied.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. In a track laying tractor having a roller support shaft with a track supporting roller journaled on roller bearings thereon; a bearing retainer mounted co-axially within the axially outward end of such roller, and spaced from such shaft, a rabbeted annular groove co-axially of the axially outward end of the bearing retainer, an annular seal protector fitted with a close, rotative fit within said rabbeted groove and press fitted onto such roller shaft flush with the axially outer face of the bearing retainer, said seal protector having a groove in its periphery, a ring fitted to ride in the seal protector groove and spring pressed outwardly against the bearing protector to turn with the latter, a seal seat in the bearing retainer spaced axially inwardly from the seal protector, a pair of annular seals of resilient seal material inserted with a slight radial clearance within said seat, each seal comprising an annular, outer body portion, and a tapered, inwardly extending lip offset angularly, axially outwardly from the seal body portion, each seal having an inner diameter less than the diameter of said shaft so as to be stretched into close sealing engagement therewith when fitted thereon, an annular spacer interposed co-axially between the seal body portions, and a seal retainer press fitted into the axially inward end of the bearing retainer and engaging the axially inward seal to retain the seals and their interposed spacing member in their seat.

2. In a track laying tractor having a roller support shaft with a track supporting roller journaled on roller bearings thereon; a bearing retainer mounted co-axially within the axially outward end of such roller, and spaced from the shaft; a bearing seal structure which comprises an annular seal protector press fitted onto the shaft, a seal seat in the bearing retainer spaced axially inwardly from the seal protector, a pair of annular seals of resilient seal material inserted with a slight radial clearance within said seat, each seal comprising an annular, outer body portion, and a tapered, inwardly extending lip offset angularly, axially outwardly from the seal body portion, each seal having an inner diameter less than the diameter of said shaft so as to be stretched into close sealing engagement therewith when fitted thereon, an annular spacer interposed co-axially between the seal body portions, a seal retainer secured in the axially inward end of the bearing retainer and engaging the axially inward seal to retain the seals and their interposed spacing member in their seat, and a sleeve of a material substantially harder than said shaft inlaid co-axially in said shaft to register with said seals, whereby the wear caused by rotation of the seals on said shaft is substantially reduced.

3. In a track laying tractor having a roller support shaft with a track supporting roller journaled on roller bearings thereon; a bearing retainer mounted co-axially within the axially outward end of such roller, the axially inward end of said retainer being in endwise positioning engagement with a bearing element of a roller bearing in pre-load adjusted position, the axially outward end of said bearing retainer overlying an end of such track supporting roller, means spacing the axially outward end of the retainer from the roller for retaining such roller bearing in pre-load adjusted position, a cylindrical portion of the bearing retainer extending co-axially, in interfitted relation, into the end of the roller, and spaced from the shaft, a counterbore in the axially outward end of the bearing retainer, an annular seal protector fitted with a close, rotative fit within said counterbore and press fitted onto the shaft flush with the axially outward face of the bearing retainer, a seal seat in the bearing retainer spaced axially inwardly of the seal protector, a pair of annular seals of resilient seal material inserted with a slight radial clearance within said seat, each seal comprising an annular, radially outward body portion, and a tapered, radially inwardly extending lip offset angularly, axially outwardly from the seal body portion, each seal having an inner diameter less than the diameter of said shaft so as to be stretched into close, sealing engagement therewith when fitted thereon, means spacing the lip portions of said seals apart to provide a grease reservoir therebetween, and a seal retainer press-fitted into the axially inward end of the seal seat and engaging the axially inward seal to retain the seals in their seat.

References Cited in the file of this patent

UNITED STATES PATENTS

| | | |
|---|---|---|
| 2,276,225 | Carter | Mar. 10, 1942 |
| 2,676,040 | Dalton | Apr. 20, 1954 |

FOREIGN PATENTS

| | | |
|---|---|---|
| 51,229 | Netherlands | Oct. 15, 1941 |